W. F. CLASEN.
TRAIN PIPE COUPLING.
APPLICATION FILED FEB. 1, 1906.
913,811.
Patented Mar. 2, 1909
2 SHEETS—SHEET 1
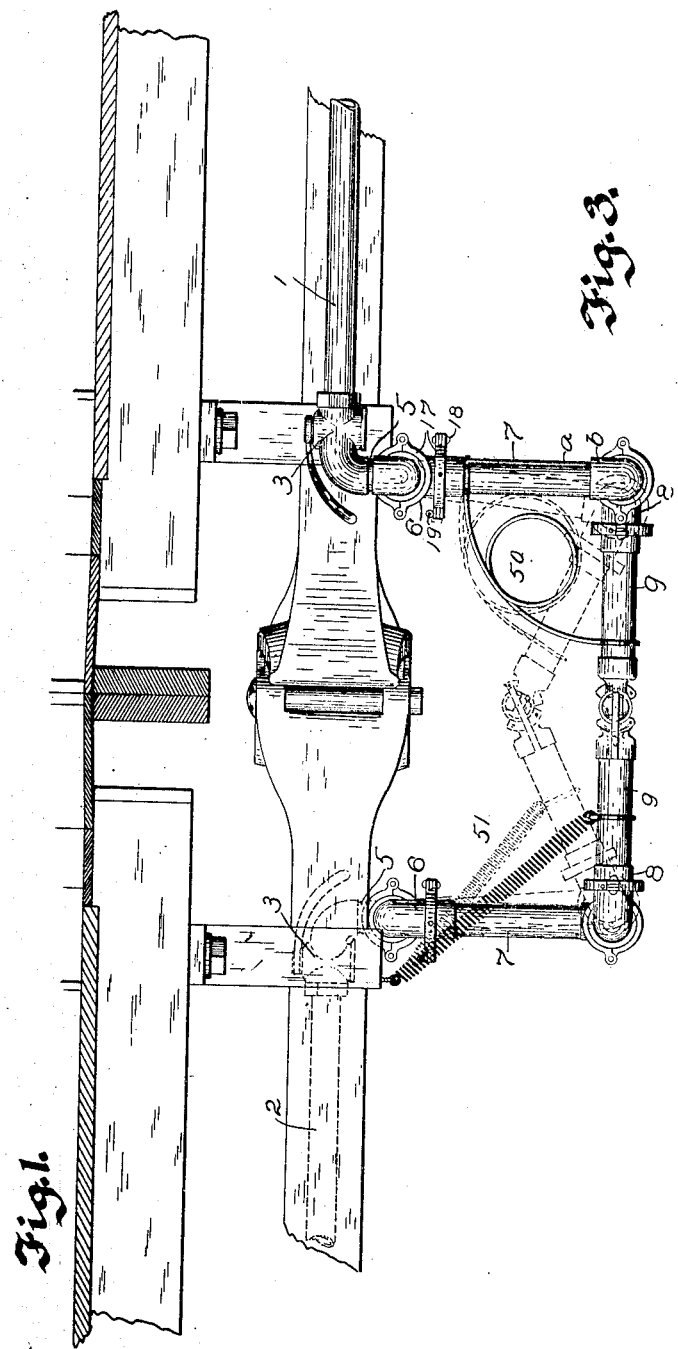
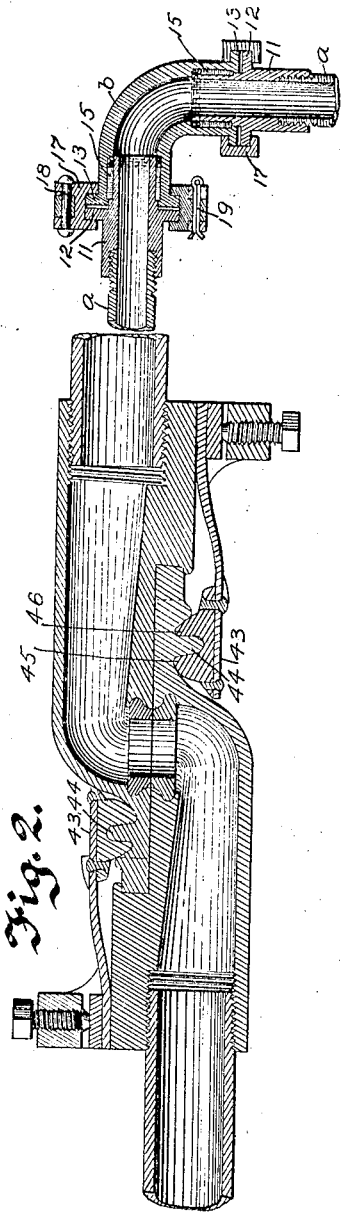

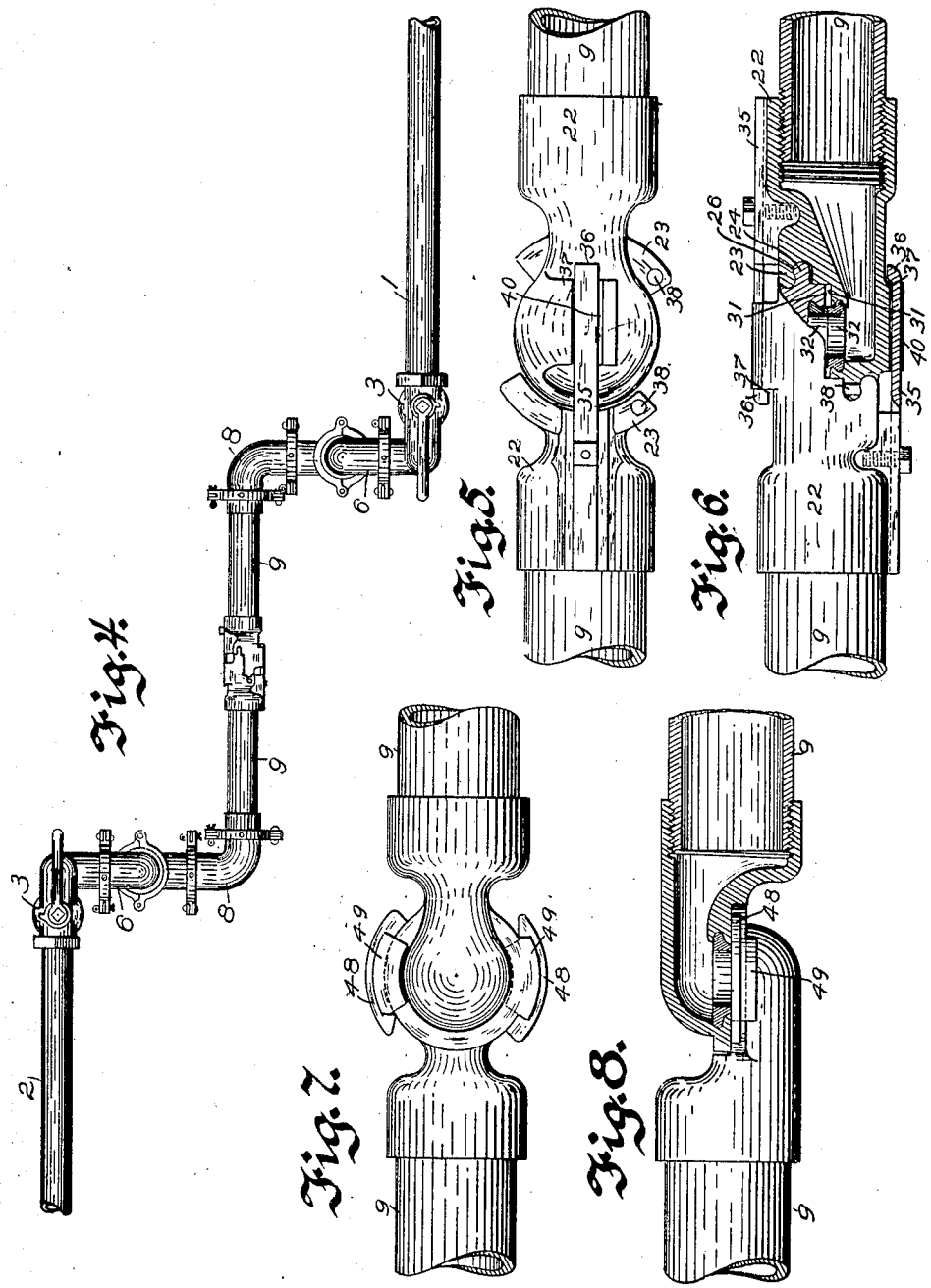

UNITED STATES PATENT OFFICE.

WILLIAM F. CLASEN, OF MILWAUKEE, WISCONSIN.

TRAIN-PIPE COUPLING.

No. 913,811.  Specification of Letters Patent.  Patented March 2, 1909.

Application filed February 1, 1906. Serial No. 298,927.

*To all whom it may concern:*

Be it known that I, WILLIAM F. CLASEN, a citizen of the United States, residing at Milwaukee, county of Milwaukee, and State of Wisconsin, have invented new and useful Improvements in Train-Pipe Couplings, of which the following is a specification.

My invention relates to improvements in "train pipe couplings".

The primary object of my invention is to provide a set of metallic coupling pipes adapted to be substituted for the ordinary hose pipe connections, the several members of said set of metallic pipes being united by a series of normally inseparable joints adapted to permit a relative rotation of the sections; and a separable coupling joint adapted to rigidly connect two of the sections, whereby leakage is prevented at the rotary joints by preventing their longitudinal separation, and at the separable coupling joint by preventing all relative movement while the parts are united.

A further object of my invention is to provide means whereby the normally inseparable joints may be quickly opened and repacked in case of leakage.

In the following description reference is had to the accompanying drawings in which,—

Figure 1 is a side view of my invention as it is used for connecting the train pipes of two cars. Fig. 2 is a sectional view of two of the separable coupling joint members showing a modified form of latch. Fig. 3 is a detail sectional view of one of the rotary or normally inseparable joints. Fig. 4 is a plan view of the set of inter-connected coupling members. Fig. 5 is an enlarged side view of the separable joint shown in Fig. 1. Fig. 6 is a top view of the same part in section. Figs. 7 and 8 are similar views showing a slight modification in the construction of the separable coupling members shown in Fig. 1.

Like parts are identified by the same reference characters throughout the several views.

1 and 2 are the ordinary train pipes of the respective cars, these being provided with valves 3 whereby the pipes may be closed when the cars are separated. The connection between the pipes 1 and 2 is made by sets of metallic members 5, 6, 7, 8 and 9, one such set being attached to each of the train pipes 1 and 2 respectively. The members 5 and 6, 6 and 7, 7 and 8 are connected by normally inseparable joints, which are arranged, however, to permit relative rotation of the respective members. The construction of these joints is best illustrated in Fig. 3.

It will be observed that each of the members except the member 9 comprises a straight section *a* and an elbowed section *b*, the latter being provided with an annular flange 13 on its outer end, and the former being screw threaded at its outer end for the reception of a connecting section 11, having a flange 12 adapted to abut the flange 13. The connecting section extends within the section *b* and the opposing surfaces are recessed to receive the annular packing 15. The opposing surfaces of the flanges 12 and 13 are also ground to form a tight joint, and are held together by a perforated channeled ring 17, which is formed in sections hinged at 18 and connected by a link pin or bolt 19 on the side opposite the hinge. By withdrawing the bolt or pin 19 the sections of the ring 17 may be separated to release the flanges 12 and 13, whereupon the joint may be opened and repacked.

By using the elbowed sections and providing for relative rotation of the parts, a substantially universal movement of the terminal section 9 is permitted, since the series of members so connected are permitted to rotate on a plurality of horizontal axes extending at right angles to each other, and on one vertical axis.

Referring to Figs. 5 and 6 which best show the construction of the separable coupling joint, it will be observed that each section 9 is provided with a connecting member 22, each of which is provided with a segmental tongue 23 and a segmental groove 24 adapted to register with a corresponding tongue and groove on the opposing connecting member 22 whereby the members are interlocked. The construction is such that the tongues 23 cannot be readily engaged in the grooves 24, except by raising the members 9 to a relatively angular position as indicated by dotted lines in Fig. 1, each of the tongues being provided with a rounded surface 26 adapted to engage a corresponding concave surface in the channel 24. The passage through the connecting member 22 extends longitudinally therein as best shown in Fig. 6, and thence at substantially right angles through the abutting faces 31 of the members. The members 22 are therefore lap jointed and provided with laterally communicating ports. A compressible ring 32 is set in the connecting members around the port or opening, whereby lateral leakage is prevented when the two ports are brought into registry. These rings 32 are arranged to project resiliently beyond the surfaces 31 so that said surfaces remain normally separated by the resilient pressure of the packing, thus pushing the rounded portions 26 of the tongues 23 forcibly into the concave portions of the channels 24 and tending to prevent a longitudinal separation of the connecting members 22. Each of the connecting members, however, is provided with a resilient latch bar 35 having a latch head 36 adapted to engage a flange 37 on the opposing connecting member, which flange serves as a catch. In case the connecting members 22 are forced together longitudinally as indicated in Fig. 2, the latch head 36 will lift on coming in contact with the flange 37 and pass over the flange to locking position, but if the parts are swung together from the position indicated by dotted lines in Fig. 1, the latch head will move inwardly in the rear of flange 37 to locking position. The engaging face of the latch-head is slightly beveled or rounded, so that said latch will release without breaking if the cars should become uncoupled. Each of the segmental tongues 23 is provided with a lug 38, which is adapted to engage the opposing member 22 or the projecting segmental portion thereof which carries the tongue 23 and groove 24, whereby the members are prevented from dropping while they are being coupled or from sagging after they are coupled together, the construction being such that when the members 22 are coupled together, the members 9 will occupy a horizontal position with the lugs 38 in contact with the segmental flanges having the tongues and grooves 23 and 24. It will be observed however, that as the outer ends of the members 9 are free to rotate in the joints connecting them with the members 8, it would be possible for the members 9 to rotate while the train is in motion until the lugs 38 are uppermost, whereupon the members 9 would be permitted to sag to uncoupling position, it not being practical to depend entirely upon the springs 50 and 51 hereinafter described. For this reason I have arranged for additionally supporting the members 22 and 9 against the tendency to sag, this being accomplished by means of the latch bars 35.

It will be observed that each of the latches 35 when in locking position is adapted to engage in a longitudinal channel 40 formed in the opposing member and extending substantially across the axes of the lateral ports in the respective members, the channels 40 being formed in the outer surfaces of the respective members opposite the sides through which said ports open, so that when the two members are locked together they are not only held against longitudinal separation, but against vertical movement, the joint thus formed being rigid, except under a pull sufficient to cause the latch head to lift and ride over the catch flange 37. The engagement of the tongues 23 in the segmental grooves 24 is principally relied upon, however, to prevent a longitudinal separation of the members 22 and it is therefore possible, if desired, to omit the latch head 36, retaining the latch bar however, to prevent sagging as above explained.

Fig. 2 shows a modified form of latch head 43, which is forked and adapted to engage over a tongue 44 and in channels 45 and 46 at each side of the tongue, the joint being otherwise constructed substantially the same as in Figs. 1, 4 and 5. Figs. 7 and 8 show a curved latch bar 48 adapted to ride upon and engage a rounded shoulder 49.

Any one of these separable couplings may be employed to connect one set of metallic members with the coupling member of the hose pipe connections in ordinary use so that it will not be necessary that all the cars shall be simultaneously equipped with metallic members. When disengaged, the several portions are held substantially in normal position by means of springs 50 and 51.

Having thus described my invention what I claim as new and desire to secure by Letters Patent is,—

1. The combination with a train pipe, of a set of elbowed members connected with each other by joints adapted to permit a relative rotation, a terminal member for said set provided with a coupling member adapted to fit a corresponding member on another set and having segmentally tongued and grooved flanges adapted to be swung into mutual interlocking engagement with corresponding flanges on another set to prevent longitudinal separation of the members under ordinary strains and when in a normal horizontal position,—and a rigidly connected fastening member projecting longitudinally and comprising a supporting bar, a latch head adapted to engage the interlocking coupling member, said coupling member being also provided with means for engaging a similar fastening member on such interlocking coupling member, and said fastening members and engaging means being adapted, when in an engaging position, to prevent the coupling members from rotating to disengage the segmentally tongued and grooved flanges.

2. The combination with a train pipe, of a flexible metallic extension comprising a set of inter-connected members; a terminal member for said set, provided with a coupling member; a latch bar connected with each coupling member and adapted to engage a projection on a similar coupling member with which the first member is adapted to interlock;—each of said inter-locking coupling members being provided with a longitudinal channel in the outer surface of said member opposite the interlocking faces of the members for the reception of the latch bar of the other member, and said latch bars being formed of resilient material and provided with a latch head having a catch engaging face angularly disposed and adapted to slip under excessive strain to permit a longitudinal separation of the coupling members.

3. The combination with a train pipe, of a set of elbow members connected with each other by joints adapted to permit a relative rotation, a terminal member for said set provided with a coupling member adapted to fit the corresponding member on another set and having tongued and grooved flanges adapted for mutual interlocking engagement with corresponding flanges on the other set and arranged to prevent longitudinal separation of the members under ordinary strains and when in a normal horizontal position, each of said coupling members being provided with a longitudinal projecting bar adapted to fit a longitudinal channel in the other member to prevent the terminal members from sagging out of such normal horizontal position.

4. The combination with a train pipe, of a set of elbow members connected with each other by joints adapted to permit a relative rotation, and a terminal member for said set provided with a coupling member adapted to fit a corresponding member on another set, and having segmentally tongued and grooved flanges adapted to be swung into mutual interlocking engagement with corresponding flanges on another set to prevent longitudinal separation of the members under ordinary strains and when in a normal horizontal position,—said coupling member being provided with a laterally opening port on one side and a channel on the other side extending substantially across the axis of the port and adapted to receive a latch bar connected with the opposing member, a latch bar on said member adapted to engage a corresponding channel in the opposing member, whereby, when said latch bars are engaged in the respective channels, a swinging movement of the coupling members to disengage the tongue and groove segments is prevented.

5. The combination with a train pipe, of a set of elbowed members connected with each other by joints adapted to permit a relative rotation, a terminal member for said set provided with a coupling member adapted to fit a corresponding member on another set and having segmentally tongued and grooved flanges adapted to be swung into mutual interlocking engagement with corresponding flanges on another set to prevent longitudinal separation of the members under ordinary strains and when in a normal horizontal position,—and a rigidly connected fastening member projecting longitudinally and comprising a supporting bar, a latch head adapted to engage the interlocking coupling member, said coupling member being also provided with means for engaging a similar fastening member on such interlocking coupling member, and said fastening members and engaging means being adapted, when in an engaging position, to prevent the coupling members from rotating to disengage the segmentally tongued and grooved flanges, together with means for resiliently supporting said coupling member when in a horizontal position.

In testimony whereof I affix my signature in the presence of two witnesses.

WILLIAM F. CLASEN.

Witnesses:
LEVERETT C. WHEELER,
JAS. B. ERWIN.